United States Patent
Choi et al.

(10) Patent No.: US 9,760,142 B2
(45) Date of Patent: Sep. 12, 2017

(54) POWER MANAGEMENT BASED ON CIRCUIT CONNECTION INFORMATION

(71) Applicant: International Business Machines Corporation, Armonk, NY (US)

(72) Inventors: Jonghyuk Choi, Yorktown Heights, NY (US); Jack Kouloheris, Yorktown Heights, NY (US); John P. Karidis, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/969,546

(22) Filed: Dec. 15, 2015

(65) Prior Publication Data

US 2017/0168536 A1   Jun. 15, 2017

(51) Int. Cl.
| | |
|---|---|
| G06F 1/00 | (2006.01) |
| G06F 1/28 | (2006.01) |
| G06F 1/32 | (2006.01) |
| H02H 3/08 | (2006.01) |

(52) U.S. Cl.
CPC .............. *G06F 1/28* (2013.01); *G06F 1/3287* (2013.01); *G06F 1/3203* (2013.01); *G06F 1/3296* (2013.01); *H02H 3/08* (2013.01)

(58) Field of Classification Search
CPC ....... H02H 3/08; G06F 1/3203; G06F 1/3296; G06F 1/28; G06F 1/3287
See application file for complete search history.

(56) References Cited

U.S. PATENT DOCUMENTS

| | | | | |
|---|---|---|---|---|
| 6,385,024 | B1* | 5/2002 | Olson | H02J 1/00 361/87 |
| 2014/0136863 | A1* | 5/2014 | Fritchman | G06F 1/26 713/310 |
| 2015/0378425 | A1* | 12/2015 | Kelly | G06F 1/3203 713/323 |
| 2016/0204658 | A1* | 7/2016 | Bae | H02J 17/00 307/104 |

* cited by examiner

*Primary Examiner* — Xuxing Chen
(74) *Attorney, Agent, or Firm* — Harrington & Smith

(57) ABSTRACT

In accordance with the example embodiments of the invention there is at least a method and apparatus to perform receiving, by a receiver, more than one modulated signal from each of more than one transmitter of at least one branch circuit, wherein each modulated signal includes a transmitter identification signal; based on characteristics of the more than one modulated signal, detecting at least a number of power supplies on each branch circuit and a power draw from each power supply of the number of power supplies on each branch circuit, wherein the characteristics include a power rating of each power supply of the number of power supplies; and based on the detected information, controlling at least the power draw from each power supply of the number of power supplies on each branch circuit.

16 Claims, 5 Drawing Sheets

---

510: Receiving, by a receiver, more than one modulated signal from each of more than one transmitter of at least one branch circuit, wherein each modulated signal comprises a transmitter identification signal 520: Based on characteristics of the more than one modulated signal, detecting at least a number of power supplies on each branch circuit and a power draw from each power supply of the number of power supplies on each branch circuit, wherein the characteristics comprise a power rating of each power supply of the number of power supplies 530: Based on the detected information, controlling at least the power draw from each power supply of the number of power supplies on each branch circuit

POWER MANAGEMENT BASED ON CIRCUIT CONNECTION INFORMATION

TECHNICAL FIELD

The teachings in accordance with the example embodiments of this invention relate generally to the power management of one or more electronic equipment and, more specifically, relate to solve the overloading of an electric circuit branch that may be caused when multiple electric cables are connected to a single circuit branch.

BACKGROUND

This section is intended to provide a background or context to the example embodiments of the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In general a blade system or blade center is based on a modular component design optimized to minimize the use of physical space and energy. Blade systems can hold multiple blade servers in a blade enclosure. A blade system provides services such as power, cooling, networking, and various interconnects. Together, blades and the blade enclosure form the blade system. Different blade providers have differing principles regarding what to include in the blade itself, and in the blade system altogether.

FIG. 1 shows an example of a device which may use a blade center or system. A blade server or system can house several circuit blades and power supplies for example, and each of the power supplies may associated with a particular blade. In operation any blade of such a blade server can trip a circuit breaker such and disrupt power to a blade if its power supplies are plugged into a same circuit. Also at least part of the blade center could be shut down due to the circuit breaker tripping when it tries to draw higher current than is allowed by the circuit breaker. This could happen even if no other electrical equipment are attached to the circuit. In certain situations such as when a blade center is used for critical equipment, such as medical or factory equipment, such a power disruption to a circuit shared with such a blade center could be even more problematic. Therefore, a need exists to solve such disruptions.

The example embodiments of the invention work to address at least the power issues associated with a blade system as described above.

SUMMARY

In an example aspect of the invention, there is a method comprising: receiving, by a receiver, more than one modulated signal from each of more than one transmitter of at least one branch circuit, wherein each modulated signal comprises a transmitter identification signal; based on characteristics of the more than one modulated signal, detecting at least a number of power supplies on each branch circuit and a power draw from each power supply of the number of power supplies on each branch circuit, wherein the characteristics comprise a power rating of each power supply of the number of power supplies; and based on the detected information, controlling at least the power draw from each power supply of the number of power supplies on each branch circuit.

In another example aspect of the invention, there is an apparatus comprising: at least one processor; and at least one memory including computer program code, where the at least one memory and the computer program code are configured, with the at least one processor, to cause the apparatus to at least: receive more than one modulated signal from each of more than one transmitter of at least one branch circuit, wherein each modulated signal comprises a transmitter identification signal; based on characteristics of the more than one modulated signal, detect at least a number of power supplies on each branch circuit and a power draw from each power supply of the number of power supplies on each branch circuit, wherein the characteristics comprise a power rating of each power supply of the number of power supplies; and based on the detected information, control at least the power draw from each power supply of the number of power supplies on each branch circuit.

In another example aspect of the invention, there is a method, comprising: transmitting a modulated signal over at least one branch circuit of a circuit blade system; wherein characteristics of the modulated signal are for use to detect at least a number of power supplies on the at least one branch circuit and characteristics of each of the number of power supplies on each branch circuit of the at least one branch circuit, wherein the characteristics comprise a power rating of each power supply of the number of power supplies; and wherein the detected information is for use to at least control a power draw over each branch circuit associated with each power supply of the number of power supplies on each branch circuit.

In still another example aspect of the invention, there is an apparatus comprising: at least one processor; and at least one memory including computer program code, where the at least one memory and the computer program code are configured, with the at least one processor, to cause the apparatus to at least: transmit a modulated signal over at least one branch circuit of a circuit blade system; wherein characteristics of the modulated signal are for use to detect at least a number of power supplies on the at least one branch circuit and characteristics of each of the number of power supplies on each branch circuit of the at least one branch circuit, wherein the characteristics comprise a power rating of each power supply of the number of power supplies; and wherein the detected information is for use to at least control a power draw over each branch circuit associated with each power supply of the number of power supplies on each branch circuit.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
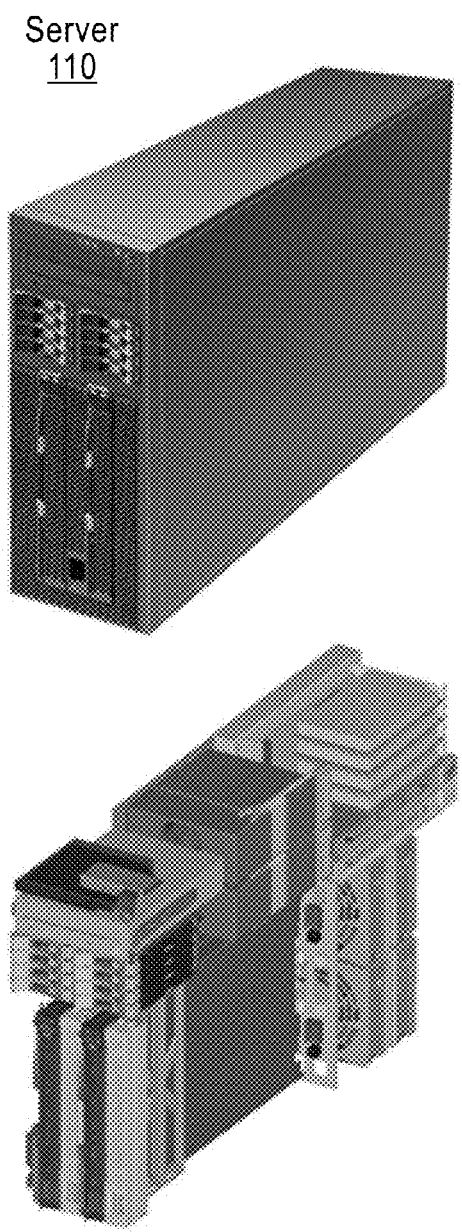
FIG. 1 shows an example of a device which may use a blade center.

In this invention, we propose a novel method of power management of one or more electronic equipment devices for use in environments having constrained electric circuit capacity. More specifically, this invention aims to solve the overloading of an electric circuit branch that may be caused when multiple electric cords are plugged into a single circuit branch.

One or more power supplies attached to the electric cords can attempt to draw larger current beyond the maximum capacity of a circuit. Whereas catastrophic results can be prevented by the circuit breaker for a circuit branch, the interruption of power supply will not only be cumbersome but also be unacceptable in certain critical applications. The interruption would also reduce the reliability of the affected equipment. The example embodiments of the invention solves this circuit overloading problem by providing a means of collecting information about the equipment plugged into a circuit and performing power management operations in accordance with the collected information about circuit connection condition.

Steps may be taken to try to avoid such power disruption situations at blade centers. These steps can include customer education about dedicated circuit requirements, electrical planning, and installation aided by certified electrician. This is especially true in 110V environments where such a power disruption can be exacerbated by the use of a blade center. Another option may be to recommend 220V as a primary option, despite 110V support. However, it is unclear that such an option would be supported by a blade center or be workable in a blade center environment, such as in a small to medium size business environment.

The example embodiments of the invention work to improve power management of electronic equipment which use such blade centers which are constrained by electric circuit capacities due to circuit breakers or interrupters, such as low voltage circuit breakers or interrupters.

The example embodiments of the invention utilize circuit identification apparatus and methods in order to find out whether more than one power supply units in a system reside on the same power circuit branch and then which of the power supply units share the same circuit branch. With this information, the example embodiments of the invention adjusts current sharing ratio of the power supply units in order to control aggregate current draw from any one circuit branch such that the current draw does not to exceed a safety limit.

A circuit breaker finder consists of a signal transmitter and a receiver. The transmitter generates and injects a modulated signal to electric circuit from the wall socket it is plugged to. When the receiver is placed in close proximity to the other wall sockets or the circuit breaker on the same circuit, the receiver can properly demodulated the signal and extract the identification information contained in the modulated signal. The example embodiments of the invention can utilize these types of circuit identification means as key components for circuit connection topology identification in one or more embodiments.

On the other hand, if the receiver resides on a circuit different from the transmitter, it cannot detect the right identification information due to the attenuation of the modulated signal by the intervening circuit breakers. In accordance with an example embodiment of the invention a signal peak recording and comparison means in the receiver enables automatic calibration.

Figure 2:
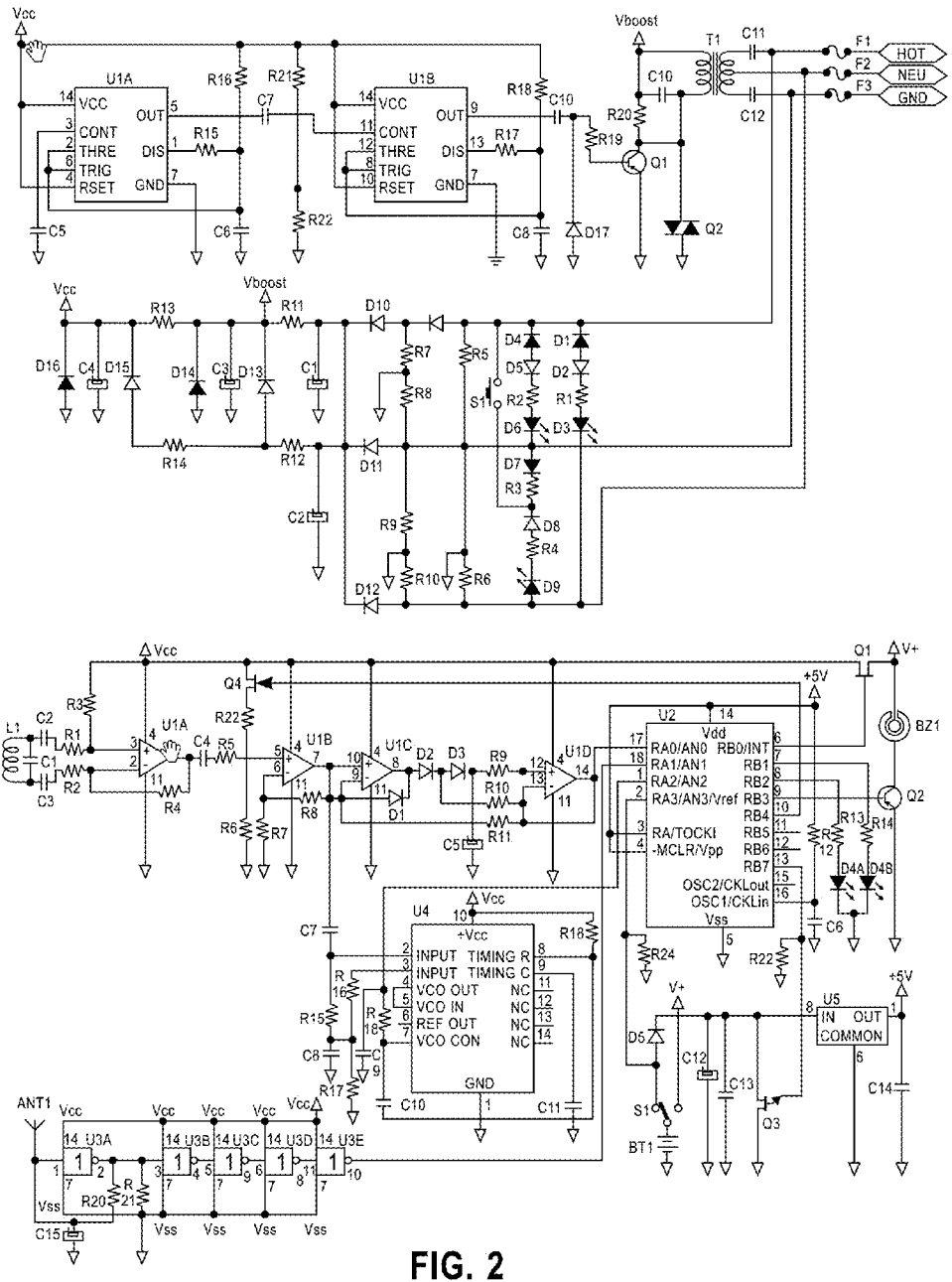
FIG. 2 shows schematic diagram of a receiver which may be configured in accordance with the example embodiments of the invention.

FIG. 2 illustrates is a schematic diagram of a receiver which may be configured to operate in accordance with the example embodiments. Similar circuitry of FIG. 2 may be implemented as a standalone device such as a handheld device, for the purpose of detecting a low frequency magnetic field as it is formed around power line conductors of a power circuit when the circuit is energized. When the receiver is utilized to scan the energized wiring system, the unit may be used as either a locator for the circuit interrupting device (circuit breaker or fuse) which protects that particular branch circuit where the transmitter is connected, or the receiver can be used to trace energized power line wires such as power line wires that are hidden from view.

Power line communication standards have been proposed for various applications from home automation to high-speed networking in an environment where no additional cabling is desired. An X10 specification, for example, provides a low speed power line communication protocol for home automation; and a HomePlug standard proposes standards for high-speed power line networking.

In addition, signal attenuation caused by circuit breakers plays a key role in the aforementioned circuit identification means, various signal-processing techniques need be utilized to overcome such signal attenuation in order to enable power line communication between separate circuit branches separated by circuit breakers.

The power line communication standards and technologies are relevant to the embodiments of the invention in which power supply modules of one or more systems need to exchange information about their status. They can exchange dynamic status information such as the average and current power consumption levels as well as static information such as maximum and typical power ratings of individual power supply modules in order to perform collaborative power management given an electric circuit connection topology.

Figure 3:
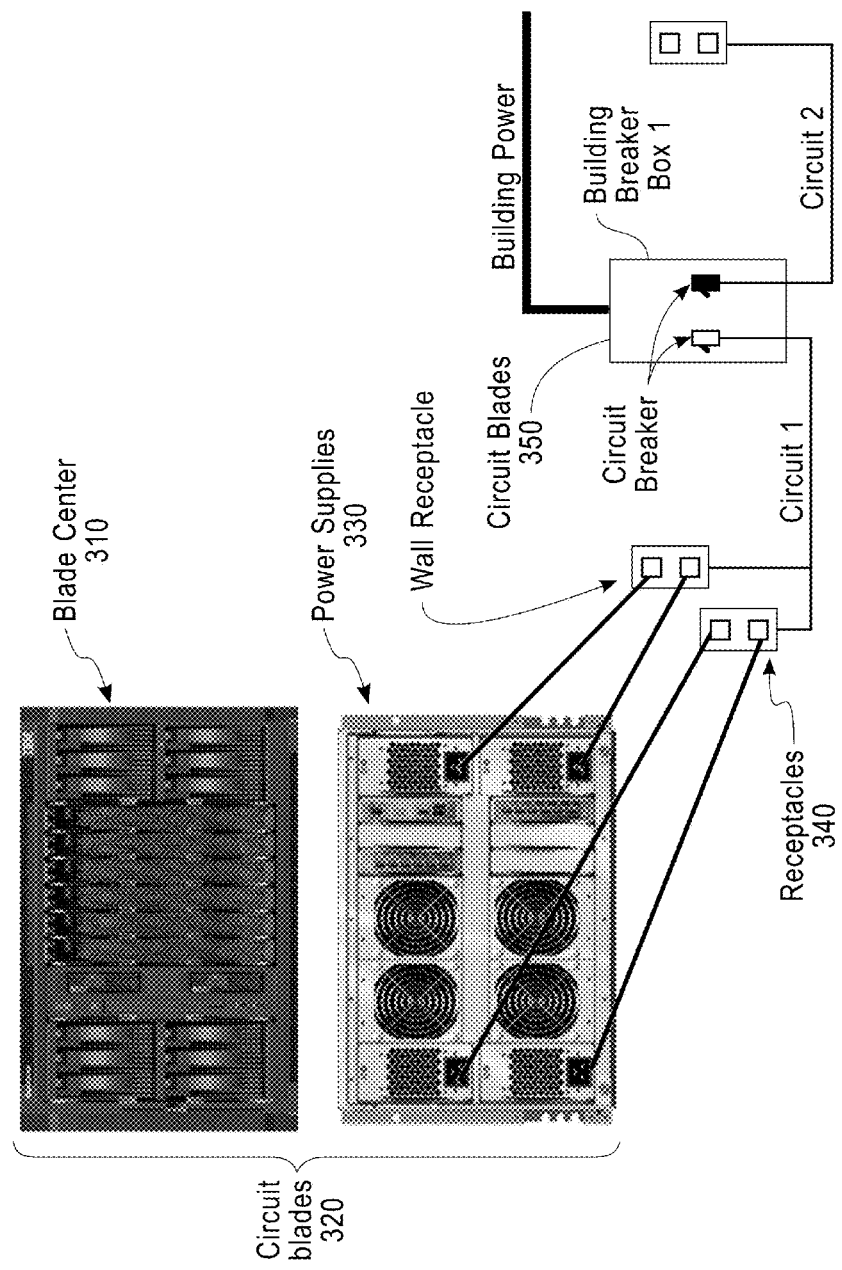
FIG. 3 shows an IBM BladeCenter which can be configured to use the example embodiments of the invention.

FIG. 3 illustrates an IBM BladeCenter (blade center 310) which can be configured to use the example embodiments of the invention may applied to its benefit. As shown in FIG. 3 there are at least four circuit blades 320 and four power supplies 330. In this example it may be seen that each of the four power supplies 330 are associated with a particular blade of this blade center 310. As shown in FIG. 3, the transmitters in accordance with the example embodiments may be plugged into any of the receptacles 340, and the receivers in accordance with the example embodiments may be incorporated in power input circuitry associated with the power supplies 330. The example embodiments of the invention can perform power management operations such that circuit breakers such as the circuit breakers 350 as in FIG. 3 are not tripped needlessly.

The example Blade Center (blade center 310) has a maximumpower draw of 3,500 watts. It might draw this much power if it were configured with 6 high-powered compute blades and a high performance storage subsystem as well as additional I/O adapters. A standard US home or office 110 volt circuit (called a NEMA 5-15 circuit) can supply only 15 Amperes at 110 volts, or a little over 1500 watts. If all power cables from the server are plugged into the same circuit, as shown in FIG. 3, the circuit breaker would trip. In many home and office environments, the power outlets are not labeled as to what circuit they are connected to and hence it is very easy for the user to make the mistake of plugging all the power cables into outlets attached to the same circuit. It is the goal of this invention to enable automatic detection of such an error and either alert the user (so the configuration may be changed) and/or to automatically signal the blade servers to operate in a lower power mode in order to prevent a circuit breaker trip.

The example embodiments of the invention can be applied to operating high density, high performance computing equipment such as the blade servers in residential and business environments where only low voltage AC circuits are available. A computing server system may require multiple power cords to several dedicated 110V-15A circuits in order to operate at its highest performance. Because the power cords can be plugged into any compatible sockets, it would not be possible to prevent users of such a system from overloading low voltage AC circuits beyond clear documentation and user education. The interruption caused by the tripping of the circuit breakers may cause severe damage to the critical data and equipment, and may deteriorate the quality of service provided by the computing system.

The example embodiments of the invention utilize information about the electronic equipment connected to a given power circuit to perform power management operations in order to manage the total power consumed by all such equipment within the allowed limits of the circuit. The information about the connected equipment is exchanged among different circuit identification modules each consisting of a transmitter and a receiver submodule in association with a power input circuitry of a power supply module. The circuit identification signal is generated in such a way that the difference in signal integrity and strength can be easily identifiable if the signal is propagated from one circuit branch to another, passing one or more circuit protection devices such as circuit breakers. The example embodiments of the invention provide a coordination means to enable without conflict communication among multiple pairs of transmitters and receivers connected to a given circuit.

The example embodiments of the invention also provides a calibration means for the evaluation of the signal strength of respective transmitters within a given circuit and for the distribution of such calibration information to other receivers. In accordance with the collected information, about the equipment connected to a given circuit, the inventive method and apparatus can perform power management operations. Examples of such power management operations include throttling of operating speed of the related equipment, selective powering of equipment and their parts, and their combinations. In accordance with the example embodiments this throttling enables power to and/or from a particular blade of a blade center to stay within a voltage and current bounds of a circuit associated with the particular blade, thus preventing a circuit failure such as caused by a circuit breaker tripping due to a voltage and/or current overload.

In order to solve the power interruption due to the sharing of an electric circuit by multiple power cords attached to one or more power supply modules, the example embodiments of the invention utilize a circuit identification means in association with the power supply modules of electronic equipment. The circuit identification means used in this invention consists of a signal transmitter module and a signal receiver module for each or for one or more circuit blades. The transmitter module sends an identification signal to the circuit it is connected to and the signal receiver module detects and identifies such signals from the transmitters associated with other power supplies or other power cords of the same power supply.

In accordance with the example embodiments the transmitter sends a pulse type or a frequency modulated identification signal by coupling it to the power circuit. The receiver module detects the identification signal by a series of magnetic sensing, selection and detection means. A peak detection means and a frequency detection means are used to distinguish a transmitter connected in the same circuit from the ones connected in different circuits. Alternatively, a more sophisticated identification means could be used to exchange further information about the power requirements of the subject equipment.

In one aspect of the example embodiments of the invention, a pair of the identification signal transmitter and receiver modules are associated with each power input terminal of power supply modules. The transmitter module is used to transmit a signal to the AC power circuit containing information about the characteristics of the associated power supply module such as its existence and power ratings. The receiver module is used to receive signals from the other transmitters, identify the number of such transmitters in the same circuit branch and collect further information on the associated power supply modules. In accordance with the example embodiments operations of the pair of identification signal transmitter and receiver modules are coordinated to prevent conflict.

In another aspect of the invention, the operation of the said transmitters and receivers are coordinated by a control means. Such coordination is required to avoid potential conflicts between identification signals when multiple transmitters send signal at the same time. This example embodiment of the invention can utilize a medium access control scheme commonly used in the shared medium based communication protocols in order to coordinate multiple transmitters in a single power circuit branch. Alternatively, the operations in accordance with the example embodiments can rely on an external coordination by a separate control module attached through a second communication channel for medium access control.

In yet another aspect of the invention, the receivers are calibrated against the transmitter device associated with the same power input terminal and circuitry. This calibration information is stored for comparison of the signals from other transmitters to detect whether they are on the same circuit branch. The calibration information collected at one receiver can be distributed to other receivers to exchange calibration information about the corresponding transmitter.

In yet another aspect of the invention, a power management module is provided to perform power management decision of electronic equipment based on the collected information about the presence and/or the power consumption requirements of the equipment connected to a given circuit. Based on this information, the power management module may turn on only parts of the equipment and/or operate a certain part of the equipment in a throttled down mode in order to keep the sum of the power requirements of any equipment on the circuit branch to be no greater than its capacity.

In accordance with the example embodiments as discussed herein, at least the means of collecting information, means to enable communication, means for the evaluation of the signal strength, the circuit identification and selection means, the control means, the peak detection means, and the frequency detection means comprises at least one processor, and at least one non-transitory memory including computer program code, the computer program code executed by at least one processor.

Figure 4:
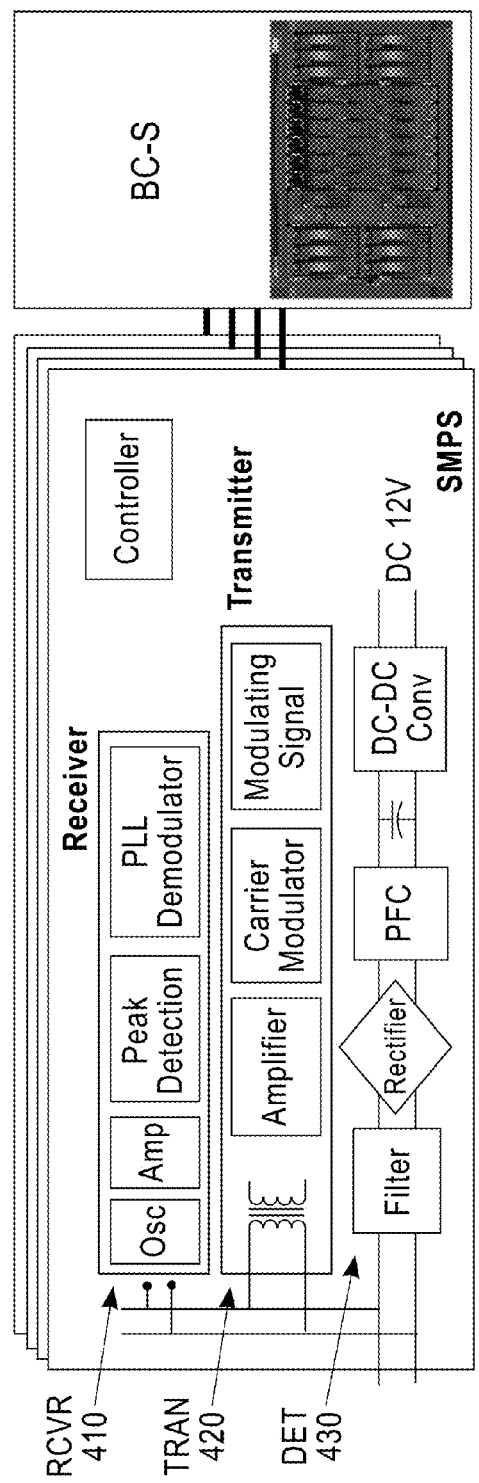
FIG. 4 shows a block diagram illustrating modules of a power supply module configured to use in accordance with the example embodiments of the invention.

FIG. 4 shows a block diagram illustrating modules of a power supply module configured to use in accordance with the example embodiments of the invention. As shown in FIG. 4 there is a receiver (410 RCVR) which includes an oscillator (OSC) module, an amplifier (Amp) module, a Peak Detection module, and a phase locked loop (PLL) demodulator module. Further, as shown in FIG. 4 there is a transmitter (420 TRAN) which includes an Amplifier module, a Carrier module, and a Modulating Signal module. Further, there is a detector (430 DET) module which includes a Filter, a Rectifier, a power factor correction (PFC) module, and a DC-DC converter (DC-DC CONV). In addition, there is a Controller module to help control the example embodiment operations of these modules. These modules as shown in FIG. 4 are configured to perform the receiving of the modulated signal, and the determination of characteristics of the modulated signal as in accordance with the example embodiments of the invention. In accordance with the example embodiments of the invention the functionality or means of these modules may be accomplished using computer program code embodied on a non-transitory memory and executed by at least one processor. In addition, the example embodiments of the invention may performed by a device, such as the power supply module as shown in FIG. 4, by using various components such as integrated circuit modules associated with the power supply module. Further, it is noted that although this power supply module is labeled a switch mode power supply (SMPS), this is non-limiting, and the power supply in accordance with the example embodiments may use any type of suitable power supply.

Figure 5A:
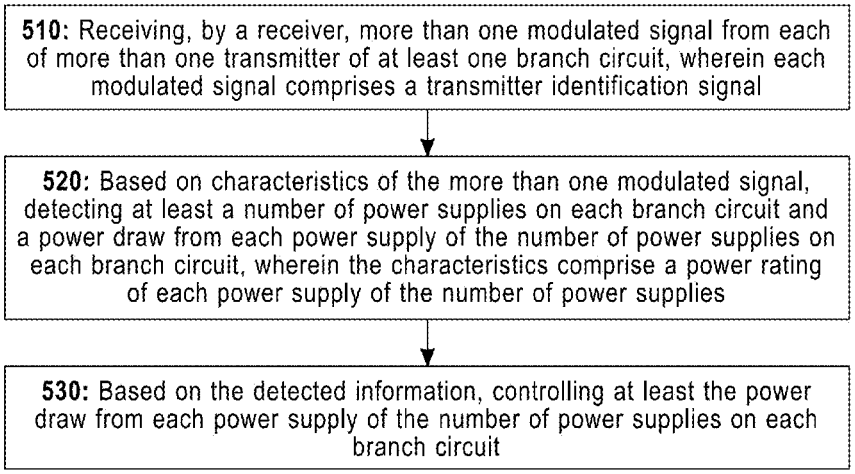
FIGS. 5A and 5B each show a method in accordance with the exemplary embodiments which may be performed by an apparatus.
Figure 5B:
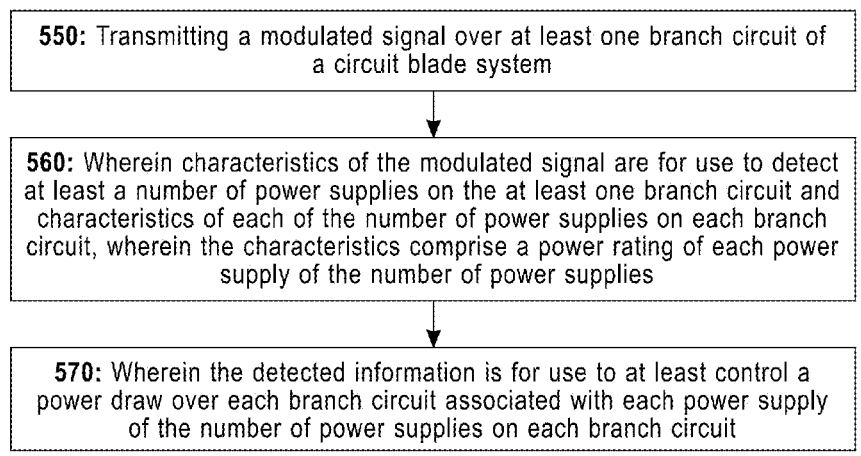

FIGS. 5A and 5B each show a method in accordance with the exemplary embodiments which may be performed by an apparatus.

FIG. 5A illustrates operations which may be performed by a device such as, but not limited to, the power supply module (e.g., as in FIG. 4). As shown in step 510 of FIG. 5A, there is receiving, by a receiver, more than one modulated signal from each of more than one transmitter of at least one branch circuit, wherein each modulated signal comprises a transmitter identification signal. As shown in step 520 there is, based on characteristics of the more than, one modulated signal, detecting at least a number of power supplies on each branch circuit and a power draw from each power supply of the number of power supplies on each branch circuit, wherein the characteristics comprise a power rating of each power supply of the number of power supplies. Then as shown in step 530 there is based on the detected information, controlling at least the power draw from each power supply of the number of power supplies on each branch circuit.

In accordance with the exemplary embodiments as described in the paragraph above, there is, based on the power rating of each power supply and the detected power draw from each power supply, selectively turning off and on certain parts of a branch circuit of the at least one branch circuit to cause a sum of power draw to be below the power rating of each power supply associated with that branch circuit.

In accordance with the exemplary embodiments as described in the paragraphs above, there is, based on at least the transmitter identification signal, determining for each transmitter a difference in signal integrity and strength as compared to other transmitters, and using at least the identified signal and strength to identifywhich circuit branch of the at least one circuit branch that transmitter is located.

In accordance with the exemplary embodiments as described in the paragraphs above, each of the modulated signals comprise calibration information, wherein the calibration information comprises a detected signal peak and a frequency of each of the more than one modulated signal, and wherein the detected signal peak and the frequency of each of the more than one modulated signal is used to determine the number of power supplies on a same branch circuit.

In accordance with the exemplary embodiments as described in the paragraphs above, the characteristics of the more than one modulated signal comprises a medium access control scheme of the modulated signal, and wherein the medium access control scheme is used to coordinate reception of the modulated signals from the number of power supplies on the same branch circuit.

In accordance with the exemplary embodiments as described in the paragraphs above, there is detecting a low frequency magnetic field formed around power line conductors of each branch circuit over which a modulated signal is received.

In accordance with an example embodiment of the invention as described above there is an apparatus comprising: means for receiving (e.g., 410 RCVR of FIG. 4) more than one modulated signal from each of more than one transmitter (e.g., 420 TRAN of FIG. 4) of at least one branch circuit, wherein each modulated signal comprises a transmitter identification signal; means based on characteristics of the more than one modulated signal, for detecting (e.g., 430 DET of FIG. 4) at least a number of power supplies on each branch circuit and a power draw from each power supply of the number of power supplies on each branch circuit, wherein the characteristics comprise a power rating of each power supply of the number of power supplies; and means, based on the detected information, for controlling at least the power draw from each power supply of the number of power supplies on each branch circuit.

FIG. 5B illustrates operations which may be performed by a device such as, but not limited to, a transmitter as may be plugged into a receptacle (e.g., receptacles 3540 as in FIG. 3). As shown in step 550 there is transmitting a modulated signal over at least one branch circuit of a circuit blade system. As shown in step 560 the characteristics of the modulated signal are for use to detect at least a number of power supplies on the at least one branch circuit and characteristics of each of the number of power supplies on each branch circuit of the at least one branch circuit, wherein the characteristics comprise a power rating of each power supply of the number of power supplies. Then as shown in step 570 the detected information is for use to at least control a power draw over each branch circuit associated with each power supply of the number of power supplies on each branch circuit.

In accordance with the exemplary embodiments as described in the paragraph above, the controlling comprises the modulated signal is used to selectively turn off and on certain parts of at least one branch circuit in order to cause a sum of the power draw to be below the power rating of each power supply of the number of power supplies.

In accordance with the exemplary embodiments as described in the paragraphs above, the modulated signal comprises calibration information, wherein the calibration information comprises a signal peak and a frequency of each of the more than one modulated signal, and wherein the signal peak and the frequency of each of the more than one modulated signal is for use to determine the number of power supplies on a same branch circuit.

In accordance with the exemplary embodiments as described in the paragraphs above, the characteristics of the modulated signal comprises a medium access control scheme of the modulated signal, and wherein the medium access control scheme is used to coordinate reception of the modulated signals from the number of power supplies on the same branch circuit.

In accordance with an example embodiment of the invention as described above there is an apparatus comprising: means for transmitting (e.g., 420 TRAN of FIG. 4) a modulated signal over at least one branch circuit of a circuit blade system; means for using the characteristics of the modulated signal are for use to detect (e.g., 430 DET) at least a number of power supplies on the at least one branch circuit and characteristics of each of the number of power supplies on each branch circuit of the at least one branch circuit, wherein the characteristics comprise a power rating of each power supply of the number of power supplies; and means for using the detected information to at least control a power draw over each branch circuit associated with each power supply of the number of power supplies on each branch circuit.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, by a receiver, more than one modulated signal from each of more than one transmitter of at least one branch circuit, wherein each modulated signal comprises a transmitter identification signal;
   based on characteristics of the more than one modulated signal, detecting at least a number of power supplies on each branch circuit and a power draw from each power supply of the number of power supplies on each branch circuit, wherein the characteristics comprise a power rating of each power supply of the number of power supplies; and
   based on the detected information, controlling at least the power draw from each power supply of the number of power supplies on each branch circuit, comprising based on the power rating of each power supply and the detected power draw from each power supply, selectively turning off and on certain parts of a branch circuit of the at least one branch circuit to cause a sum of the power draw to be below the power rating of each power supply associated with that branch circuit.

2. The method according to claim 1, comprising based on at least the transmitter identification signal determining for each transmitter a difference in signal integrity and strength as compared to other transmitters, and using at least the identified signal and strength to identify which circuit branch of the at least one circuit branch that transmitter is located.

3. The method according to claim 1, wherein each of the modulated signals comprise calibration information, wherein the calibration information comprises a detected signal peak and a frequency of each of the more than one modulated signal, and wherein the detected signal peak and the frequency of each of the more than one modulated signal is used to determine the number of power supplies on a same branch circuit.

4. The method according to claim 3, wherein the characteristics of the more than one modulated signal comprises a medium access control scheme of the modulated signal, and wherein the medium access control scheme is used to coordinate reception of the modulated signals from the number of power supplies on the same branch circuit.

5. The method according to claim 1, wherein the detecting comprises detecting a low frequency magnetic field formed around power line conductors of each branch circuit over which a modulated signal is received.

6. An apparatus comprising:
   at least one processor; and
   at least one memory including computer program code, where the at least one memory and the computer program code are configured, with the at least one processor, to cause the apparatus to at least:
   receive more than one modulated signal from each of more than one transmitter of at least one branch circuit, wherein each modulated signal comprises a transmitter identification signal;
   based on characteristics of the more than one modulated signal, detect at least a number of power supplies on each branch circuit and a power draw from each power supply of the number of power supplies on each branch circuit, wherein the characteristics comprise a power rating of each power supply of the number of power supplies; and based on the detected information, control at least the power draw from each power supply of the number of power supplies on each branch circuit comprising, based on the power rating of each power supply and the detected power draw from each power supply, to selectively turn off and on certain parts of a branch circuit of the at least one branch circuit to cause a sum of the power draw to be below the power rating of each power supply associated with that branch circuit.

7. The apparatus according to claim 6, wherein the at least one memory including the computer program code is configured with the at least one processor to cause the apparatus, based on at least the transmitter identification signal, to determine for each transmitter a difference in signal integrity and strength as compared to other transmitters, and using at least the identified signal and strength to identify which circuit branch of the at least one circuit branch that transmitter is located.

8. The apparatus according to claim 6, wherein each of the modulated signals comprise calibration information, wherein the calibration information comprises a detected signal peak and a frequency of each of the more than one modulated signal, and wherein the detected signal peak and the frequency of each of the more than one modulated signal is used to determine the number of power supplies on a same branch circuit.

9. The apparatus according to claim 8, wherein the characteristics of the more than one modulated signal comprises a medium access control scheme of the modulated signal, and wherein the medium access control scheme is used to coordinate reception of the modulated signals from the number of power supplies on the same branch circuit.

10. The apparatus according to claim 6, wherein the detecting comprises detecting a low frequency magnetic field formed around power line conductors of each branch circuit over which a modulated signal is received.

11. A method, comprising:
transmitting a modulated signal over at least one branch circuit of a circuit blade system;
wherein characteristics of the modulated signal are for use to detect at least a number of power supplies on the at least one branch circuit and characteristics of each of the number of power supplies on each branch circuit of the at least one branch circuit, wherein the characteristics comprise a power rating of each power supply of the number of power supplies; and
wherein the detected information is for use to at least control a power draw over each branch circuit associated with each power supply of the number of power supplies on each branch circuit, wherein the controlling comprises the modulated signal is used to selectively turn off and on certain parts of at least one branch circuit in order to cause a sum of the power draw to be below the power rating of each power supply of the number of power supplies.

12. The method according to claim 11, wherein the modulated signal comprises calibration information, wherein the calibration information comprises a signal peak and a frequency of each of the more than one modulated signal, and wherein the signal peak and the frequency of each of the more than one modulated signal is for use to determine the number of power supplies on a same branch circuit.

13. The method according to claim 11, wherein the characteristics of the modulated signal comprises a medium access control scheme of the modulated signal, and wherein the medium access control scheme is used to coordinate reception of the modulated signals from the number of power supplies on the same branch circuit.

14. An apparatus comprising:
at least one processor; and
at least one memory including computer program code, where the at least one memory and the computer program code are configured, with the at least one processor, to cause the apparatus to at least:
transmit a modulated signal over at least one branch circuit of a circuit blade system;
wherein characteristics of the modulated signal are for use to detect at least a number of power supplies on the at least one branch circuit and characteristics of each of the number of power supplies on each branch circuit of the at least one branch circuit, wherein the characteristics comprise a power rating of each power supply of the number of power supplies; and
wherein the detected information is for use to at least control a power draw over each branch circuit associated with each power supply of the number of power supplies on each branch circuit, wherein the controlling comprises the modulated signal is used to selectively turn off and on certain parts of at least one branch circuit in order to cause a sum of the power draw to be below the power rating of each power supply of the number of power supplies.

15. The apparatus according to claim 14, wherein the modulated signal comprises calibration information, wherein the calibration information comprises a signal peak and a frequency of each of the more than one modulated signal, and wherein the signal peak and the frequency of each of the more than one modulated signal is for use to determine the number of power supplies on a same branch circuit.

16. The apparatus according to claim 14, wherein the characteristics of the modulated signal comprises a medium access control scheme of the modulated signal, and wherein the medium access control scheme is used to coordinate reception of the modulated signals from the number of power supplies on the same branch circuit.

* * * * *